March 11, 1969
C. A. LUHE
3,432,025
INSULATED INDIVIDUAL LUNCH CASE
Filed March 8, 1967
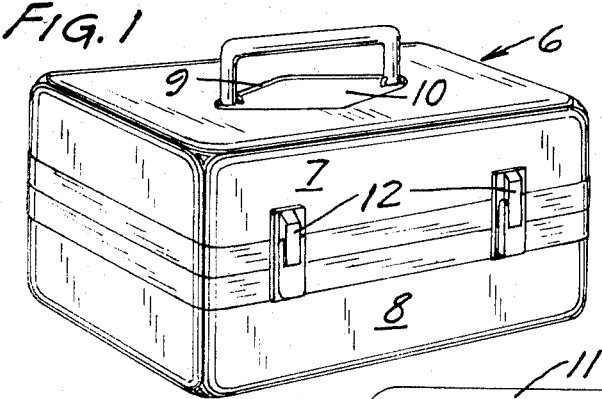
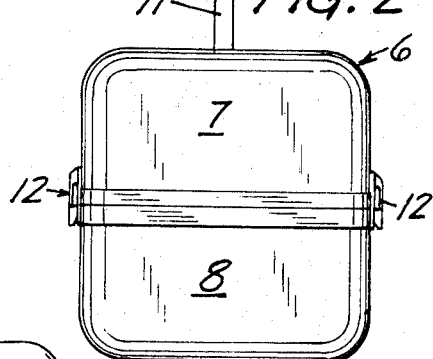
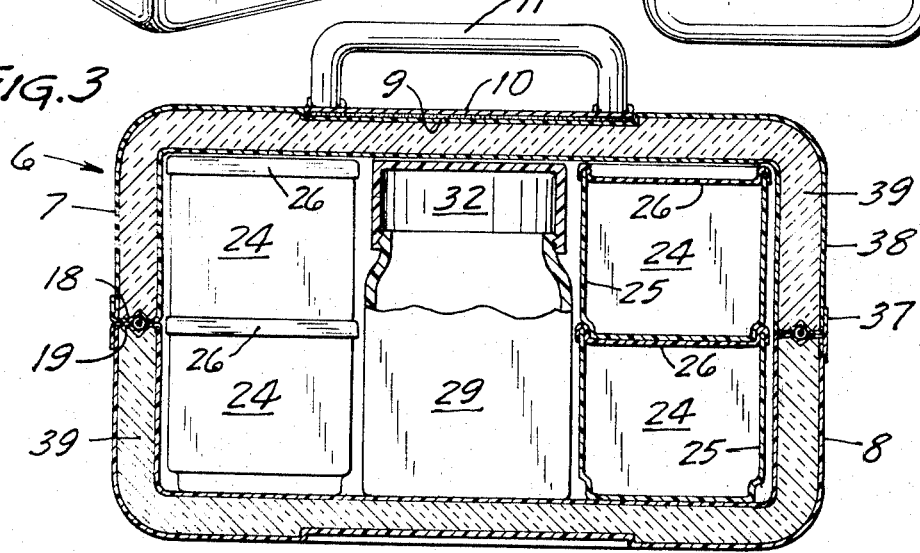
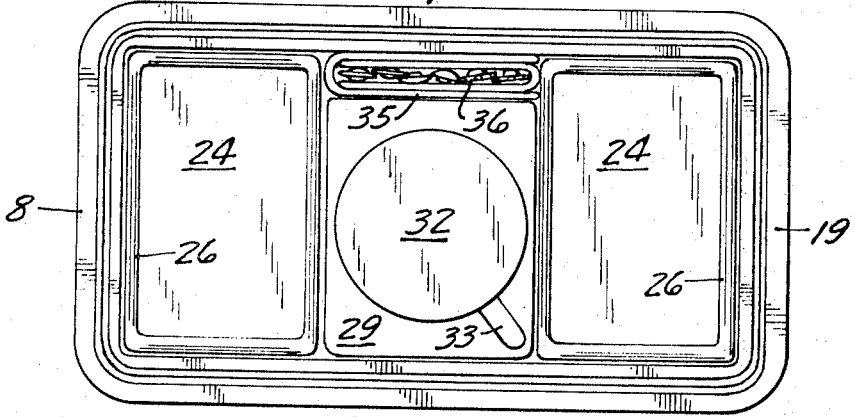
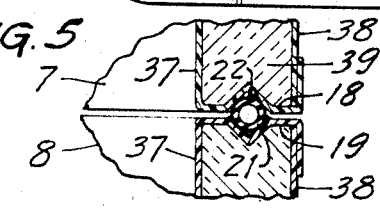
INVENTOR.
CARL A. LUHE
BY
John C Barnes
ATTORNEY

United States Patent Office 3,432,025
Patented Mar. 11, 1969

3,432,025
INSULATED INDIVIDUAL LUNCH CASE
Carl A. Luhe, St. Paul, Minn.
(Rte. 4, Thief River Falls, Minn. 56701)
Filed Mar. 8, 1967, Ser. No. 621,529
U.S. Cl. 206—4      3 Claims
Int. Cl. A45c 11/20; B65d 25/04, 25/28

ABSTRACT OF THE DISCLOSURE

A portable thermally insulated lunch case comprising two identically shaped insulated shells which mate to form a sealed chamber in which a plurality of containers may fit together and which will substantially fill the chamber.

---

This invention relates to lunch boxes and in one aspect to a novel thermally insulated individual food carrying container.

The common lunch pail is a container with hinged sections, the lower portion being rectangular and the upper portion formed for retaining a vacuum bottle for liquids. The type of lunches adapted to be carried in these pails is limited to cold foods except for the contents of the vacuum bottle.

My invention provides a lunch box which primarily increases the variety of lunches which can be carried.

My invention affords a lunch box which is suitable for carrying hot meals and keeping them hot for extended periods of time.

The lunch box of my invention comprises a pair of identical light-weight insulated rectangular shells, except for one of said shells having a handle connected thereto and one of said shells supporting a hollow flexible sealing ring which forms an insulating and hermetic seal between said shells to define an inner insulated chamber. Within this insulated chamber are at least three containers, at least a pair of which nest together and all of which substantially fill said chamber. The containers each have a size to contain an adequate helping of food. With all containers filled with warm or cold food they will remain such well over half a normal work or hunting day.

The above and further features and advantages of the present invention will be better understood after reading the following detailed description which refers to the accompanying drawing wherein:

FIGURE 1 is a perspective view of a lunch case formed according to the present invention;

FIGURE 2 is an end elevation view of the case of FIGURE 1;

FIGURE 3 is a vertical sectional view of the case of FIGURE 1 and partial sectional view of containers which fill the case;

FIGURE 4 is an enlarged detail sectional view of the seal formed between the shells forming case of FIGURES 1 to 3; and FIGURE 5 is a plan view of the shell forming the bottom of the case and of the containers therein.

Referring now to the drawing, the insulated lunch box, generally designated 6, comprises a pair of identically shaped insulated shells 7 and 8, each having wall portions connected to a rectangular top or bottom wall and defining one open side. The shells 7 and 8 mate at the edges surrounding the open side to form a sealed inner chamber in which are fitted a plurality of containers for holding food or beverages.

The shells 7 and 8 each have a recessed surface area 9 which may be generally elliptical shaped as shown. The recessed area 9 of the shell 7 or cover section has a plate 10 disposed in said recess and secured to the shell 7 as by means of an adhesive. A carrying handle 11 is secured in any well known manner to the plate 10 as by U-shaped fasteners pivotally supporting opposite ends of a rigid handle.

The cover section 7 and the other shell or base section 8 are secured together by pressure closures or over-center latches 12. These latches 12, of which there are four, each comprise a catch fixed to one shell with the movable locking member fixed to the other shell. The latches 12 are used to firmly place the illustrated mating edges 18 and 19 of the shells 7 and 8, respectively, in closed sealed mating engagement. In the illustrated embodiment four such latches are used with two latches in spaced relationship on each side of the box.

The opposed edges 18 and 19 are each formed with a V-shaped groove centrally of the edge wall and extending around the entire open sides. Positioned in this groove and suitably held by one of the shells, as by a small amount of adhesive 22, see FIGURE 4, is a continuous hollow resilient ring 21 which extends around the groove. The cross-sectional diameter of the ring is such that it substantially fills the cavity formed by the V-shaped groove in each of the edges 18 and 19 of the shells 7 and 8 and is slightly deformed when the halves are locked together by means of the latches 12. The ring 21 is not however compressed or pinched to eliminate the air gap in the center of the ring upon such closure. The ring thus provides a hermetic and insulating seal for the chamber formed by the shells 7 and 8.

In the illustrated embodiment a plurality of containers are disposed within the chamber formed by the shells. The containers have such proportions that when placed within the chamber defined by the two locked shells 7 and 8 the space within the box 6 is substantially filled thereby. At least two of the containers are adapted to stack together and in the illustrated embodiment four rectangular containers, generally designated 24, each of which include a preferably gas impermeable and heat resistant bowl 25 and fluid-tight easily sealable gas impermeable and heat resistant flexible cover 26. The bottom of each bowl 25 together with the covers 26 are designed such that the bottom of one bowl will fit in a nesting relationship within the recessed portion of the cover between the sealing edges around the periphery thereof. This permits the containers 24 to be easily stacked one above the other within the chamber. These containers are adapted to each hold a helping or serving of food which may include the main course or an entree. Also illustrated is a container 29 having a slightly greater volume than the containers 24. The container 29 is preferably rectangular in vertical cross-section and has a circular upper open end or throat 31. The container 29 is adapted for carrying a beverage or soup and is provided with an upper cover threaded onto the throat 31. The cover 32 may serve as a cup for the beverage and is therefore provided with a small handle member 33 formed therewith.

A small amount of space remains in the chamber formed by the shells 7 and 8 after positioning the four containers 24 and the container 29 within said chamber. This small space allows room to insert a napkin 35 together with eating utensils 36 and possibly small containers of dressings or condiments. All of these containers are adapted to substantially fill (affording only small areas for clearance between the containers and the walls of the shells) the chamber.

In the illustrated embodiment the overall dimensions of the inner chamber defined by the sealed shells is approximately 5½ inches high, 5¼ inches wide and 11 inches long. Lunch boxes of course may have varying dimensions depending on the number of containers desired within the insulated chamber, as an example, the container 29 could be removed in such instance, the chamber may be only 7¼ inches long or it could enclose snugly only two containers 24 and the container 29 and be 7⅛ inches long.

The material forming the shells 7 and 8 is preferably a shock proof plymeric resin insulated by a polymeric foam. Examples of suitable shock resistant materials are polypropylene and polystyrene. As illustrated, the shells are each formed to have an inner chamber wall 37 and an outer appearance wall 38 which joins and seals with the outwardly and upwardly projecting portion of the inner wall 37 which forms the edges 18 and 19 at the open side of the shells. The area between the molded walls forming each shell is filled with a suitable insulating material 39 such as polyurethane foam or polystyrene foam. Alternatively the shells could each be formed of a shock proof outer casing having mating edges with each casing lined as with a laminate type of insulating material. The containers 24 and 29 can be formed of a polymeric material which will withstand heat at 200° F. without losing shape, and examples of suitable materials are linear polypropylene, urea formaldehyde resin, melamine-formaldehyde resin, or equivalent, which make them suitable as food containers.

The nature of the containers and their nesting relationship together with the provision that the containers substantially fill the inner insulated chamber in the lunch box lessens the dissipation and transfer of heat from the food contained therein.

What I claim as my invention is:

1. A portable thermally insulated lunch box comprising two identically shaped thermally insulated shells which have the mating edges around the open ends of said shells, one shell forming the top of the box and having a handle attached thereto, the other shell forming the bottom, actuable pressure locks attached to said shells for closing and locking the shells together, means forming a pressure seal between the opposed mating edges of said shells, at least four identical mating stackable containers each including a bowl and a cover which closes and seals the bowl and receives in nesting relationship the bottom of a bowl of another like container, and a beverage container having a cup-shaped cover, all of said containers fitting in and substantially filling said chamber with at least pairs of said stackable containers being stacked together.

2. A portable thermally insulated lunch box according to claim 1 wherein said mating edges of said shells are each formed with a groove, which grooves are disposed in opposed relationship when the shells are closed and locked, and a resilient ring positioned in the groove on one of said shells to be received in the groove on the other of said shells to form a substantially hermetic seal for said chamber, said ring being tubular and having a hollow center.

3. A portable thermally insulated lunch box according to claim 2 wherein said ring is secured to the shell forming the top thus decreasing the possibility of food spilling on the groove containing the ring.

References Cited

UNITED STATES PATENTS

| | | | |
|---|---|---|---|
| 788,735 | 5/1905 | Stephan | 206—4 |
| 2,097,186 | 10/1937 | Hinnenkamp | 220—16 |
| 2,184,336 | 12/1939 | Devine | 220—16 X |
| 2,410,323 | 10/1946 | Wellman | 220—5 X |
| 2,656,946 | 10/1953 | Clarke | 220—16 |

JOSEPH R. LECLAIR, *Primary Examiner.*

J. R. GARRETT, *Assistant Examiner.*

U.S. Cl. X.R.

220—16